United States Patent [19]

Flandorfer

[11] 4,084,893

[45] Apr. 18, 1978

[54] EXPOSURE CONTROL FOR MOTION PICTURE CAMERAS

[75] Inventor: Robert Flandorfer, Frankfurt am Main, Germany

[73] Assignee: Braun Aktiengesellschaft, Frankfurt am Main, Germany

[21] Appl. No.: 679,238

[22] Filed: Apr. 22, 1976

[30] Foreign Application Priority Data

Apr. 26, 1975 Germany ............................ 2518675

[51] Int. Cl.² ............................................... G03B 7/08
[52] U.S. Cl. .................................. 352/141; 354/23 D; 354/44; 354/60 A; 250/229
[58] Field of Search ............... 352/141; 354/23 D, 44, 354/60 A; 250/229

[56] References Cited

U.S. PATENT DOCUMENTS

| 3,554,633 | 1/1971 | Sekine | 354/44 |
| 3,972,607 | 8/1976 | Reider | 352/141 |

FOREIGN PATENT DOCUMENTS 2,322,747  11/1974  Germany ........................ 354/44

*Primary Examiner*—Monroe H. Hayes
*Attorney, Agent, or Firm*—Frederick E. Bartholy

[57] ABSTRACT

A control system is described for automatically setting the exposure of a motion picture camera. The circuits shown include, as basic elements, a photoresponsive device, an amplifier connected thereto, and a stepping motor for actuating the diaphragm of the camera.

4 Claims, 2 Drawing Figures

EXPOSURE CONTROL FOR MOTION PICTURE CAMERAS

It is the primary object of the invention to provide an exposure control of the type which is stable in operation, maintains synchronization and has consistency in selected setting as well as in its response threshold.

The above object is attained in such manner that the output of the amplifier connects, on the one hand, to a reference voltage source and, on the other hand, to the input of a comparator which, depending upon the polarity and the magnitude of the potential difference, assumes various logic conditions. There is a circuit for driving a stepping motor which contains at least one sequence impulse generator driven from the comparator. In reality such exposure control works on a digital basis. The setting time of the diaphragm between F 1.8 and F 22 can be achieved in less than half a second so that the exposure regulator is practically free from inertia. Despite the rapid setting time, there are no instabilities. Particularly, no oscillation will take place, and no loss of synchronization occurs over the entire control range.

In accordance with a certain embodiment, the drive circuit contains two sequence impulse generators, the inputs of which are connected to the comparators. In this manner, the generators are controlled by the logic condition of the comparator. Such an exposure control is relatively simple to build and requires the use of only standard components. The comparator may preferably be constructed by the use of two Schmitt triggers which are controlled by positive and negative pulses, respectively.

In accordance with another embodiment, the driving arrangement includes a forward and reverse counter which is coupled to the stepping motor over a decoder circuit. The forward and reverse counting inputs thereof are connected directly to the comparator, and the input thereof, representing the count setting, connects to the output of the sequence impulse generator.

In accordance with a further modification, the reference voltage source is equipped with a switching arrangement for setting the picture frequency, the type of film, and the film sensitivity.

In the same manner, the amplifier may have switching means for setting the picture frequency, the type of film, or the sensitivity thereof. Naturally, the setting in this arrangement requires no adjustment of the reference voltage.

The invention is fully described in connection with the accompanying drawings, representing several examples of circuitry.

Figure 1:
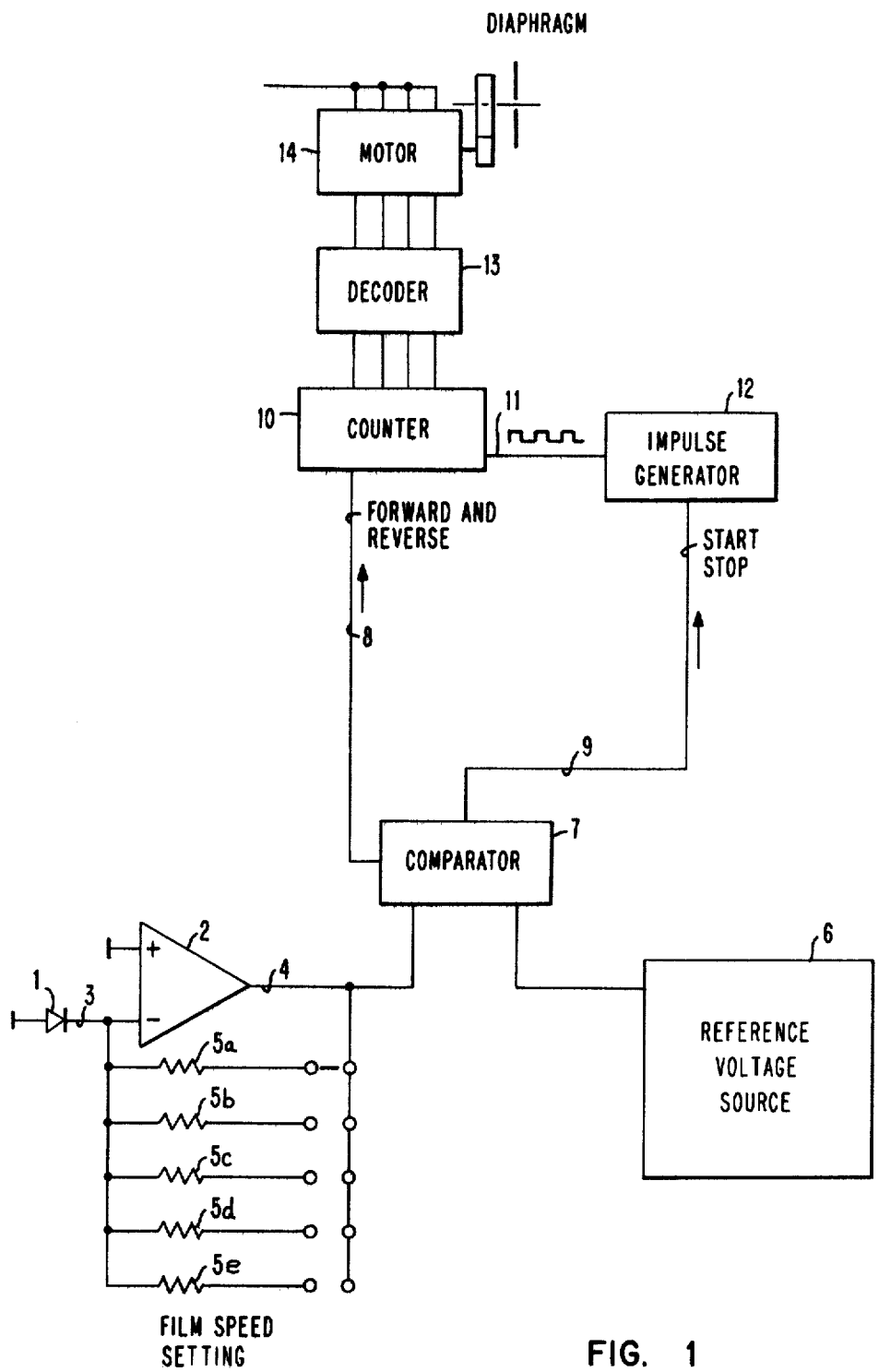
FIG. 1 is a circuit diagram of one embodiment of an exposure control accordance with the invention.

Referring to FIG. 1, a light responsive element 1 connects to the negative input of an operational amplifier 2 of which the positive input is grounded. A number of resistors 5a to 5e are connected between the negative input side and the output of the amplifier 2, together with switching means for selecting any one of these in order to provide adjustment for the film sensitivity.

The output of the operational amplifier connects to one input of the comparator 7, the other input of which connects to the output of a reference voltage source. The voltage of this source may be selected in accordance with the picture frequency, and the type of film used.

The comparator 7 has two distinct outputs. One of these, namely, 8, has a logic level which is dependent on the voltage difference at the comparator; whereas the other output, 9, has a logic level useful for control function only when the voltage difference exceeds a certain predetermined value.

The circuit also includes a bi-directional counter 10 of which the direction of counting input connects to the output 8 of the comparator 7; whereas the counting input 11 connects to the output of the sequence impulse generator 12. The input of the latter connects to the output 9 of the comparator.

The bi-directional counter has four digital outputs which connect to a decoder 13 which translates the output signals to a form of current suitable for the actuation of a stepping motor 14.

The operation of the circuit is as follows: When the amplified voltage of the photosensor at the output 4 of the operational amplifier is greater than the set value of the reference source 6, and when this output exceeds a preset threshold value, the comparator presents a logic signal at the output 8. This signal 11 actuates the counter 10 in the reverse direction. At the same time the comparator gives a logic signal over its output 9 which actuates the sequence impulse generator 12. The switching signals at the output of the counter 10 reach the decoder 13 and produce output signals which cause the stepping motor 14 to rotate in such direction that the diaphragm of a camera driven by this motor is turned towards closing. This reduces the light impinging on the photosensor 1 so that the voltage output at 4 is lowered. When this voltage is lower than the preset value of the reference voltage, the outputs 8 and 9 of the comparator are switched to the other logic state, and the sequence impulse generator 12, as well as the stepping motor 14, are stopped.

As long as the potential difference at the inputs of the comparator is below the set threshold value the motor will not operate. Only when the threshold value is exceeded will the sequence impulse generator be energized and the counter set into motion to rotate either forward or backward, depending on the polarity of the differential potential. This eliminates the possibility of the stepping motor being set into motion by small changes of brightness. The stepping motor is of a conventional construction consisting of a 4-pole stator, the windings of which are displaced 90°. The rotor is a two-pole permanent magnet disc. The decoder always energizes two windings of the stepping motor whereby four cyclicly repeating movement positions occur so that the rotor is always displaced to a given angular distance. The construction and operation of the motor is shown in more detail in connection with the embodiment illustrated in FIG. 2.

The above mentioned figure shows a detailed circuit of an exposure control in accordance with the invention. The element for measuring light sensitivity is a photoresistor 21, one terminal of which connects to the positive supply line +V and the other terminal to a variable resistor 22 which connects to the non-inverting input of an operational amplifier 23. The output thereof is also interconnected with the inverting input so that this stage functions as an impedance matching unit. The resistor 22 is connected to ground through another variable resistor 24 which may be short circuited by the switch 25.

The output of the operational amplifier 23 connects to a low pass filter comprising the components marked by reference characters 26 to 30. These components comprise an operational amplifier 30 also connected as an impedance changer of which the non-inverting input connects to ground through the condenser 29 and also, through resistors 26 and 27, in series, to the output of amplifier 23. The junction point of resistors 26 and 27 connects through a condenser 28 to the output of operational amplifier 30. The component elements referenced 26 through 30 form a circuit of a low pass filter having a cut-off frequency of 3 cycles.

To continue, there is provided a forward and reverse counter, the components thereof being referenced from 51 to 57. The counter consists of a NAND gate 51, the trigger input of which connects to the output of operational amplifier 47 and the other terminal to junction point 39. The output of the NAND gate connects to the parallel connected inputs of an AND gate 52 which serves as the inverter, the output of which connects to the input of a flip-flop 53. The non-inverting output connects to one of the inputs of a NAND gate 55, the other input being connected to the output of operational amplifier 34. The output of operational amplifier 35 connects to the input of another NAND gate 56 of which the other input connects to the inverting output $\bar{Q}$ of a flip-flop 53.

The outputs of the NAND gates 55 and 56, respectively, connect to one of the inputs of a NOR gate 57, the output of which connects to the sequence input CK of another flip-flop 54. The trigger input of each flip-flop 53 and 54 connects to its respective inverting output. The clear inputs C and the preset inputs P of each of these flip-flops 53 and 54 are not used and connect to the positive side of the supply line +V.

Another component structure is a decoder comprising parts 58, 59 and 60. These include both NAND gates 58 and 59, the output of each of which connects to one of the inputs of the NOR gates 60, respectively. Both inputs of the NAND gates 58 connect to one of the inverted outputs $\bar{Q}$ of the flip-flops 53 and 54, respectively, and both inputs of the NAND gates 59 connect to the non-inverting output Q thereof.

The exposure control also contains a comparator which consists of the component elements 31 to 37. There are three resistors, in series, namely, 31, 32 and 33. One terminal of the resistor assembly connects to the positive side +V of the supply line and the other terminal to ground. The junction point of resistors 31 and 32, connects to the non-inverting input of operational amplifier 34 and the junction point of 32 and 33 to the inverting input of operational amplifier 35. The inverting input of operational amplifier 34 and the non-inverting input of operational amplifier 35 are interconnected and terminate at the output of operational amplifier 30. At the output of each operational amplifier is a diode 36 and 37, respectively, the anodes of which terminate at the resistor 38 which is grounded.

Continuing with the description of the circuit, we find a sequence impulse generator consisting of components 39 to 50. There are two NPN transistors 39 and 40 which are connected together to form a bi-stable multivibrator. The collector of transistor 39, connects through a condenser 42 to the base of transistor 40; whereas the collector of the latter connects by way of condenser 41 with the base of transistor 39. This base is also connected to the positive supply line through a variable resistor 43. The collector of the latter also connects, by way of resistor 44, to the supply line. Furthermore, the base of transistor 40, as well as the collector thereof connect to the supply line by way of resistors 45 and 46, respectively. The latter is also connected to the inverting input of operational amplifier 47 by way of resistor 48. The non-inverting input of this amplifier connects to the output of the multivibrator by way of resistor 49 connected to the collector of transistor 40. A feedback connection is established by way of resistor 50 connected between the non-inverting input of amplifier 47 and the output thereof.

Figure 2:
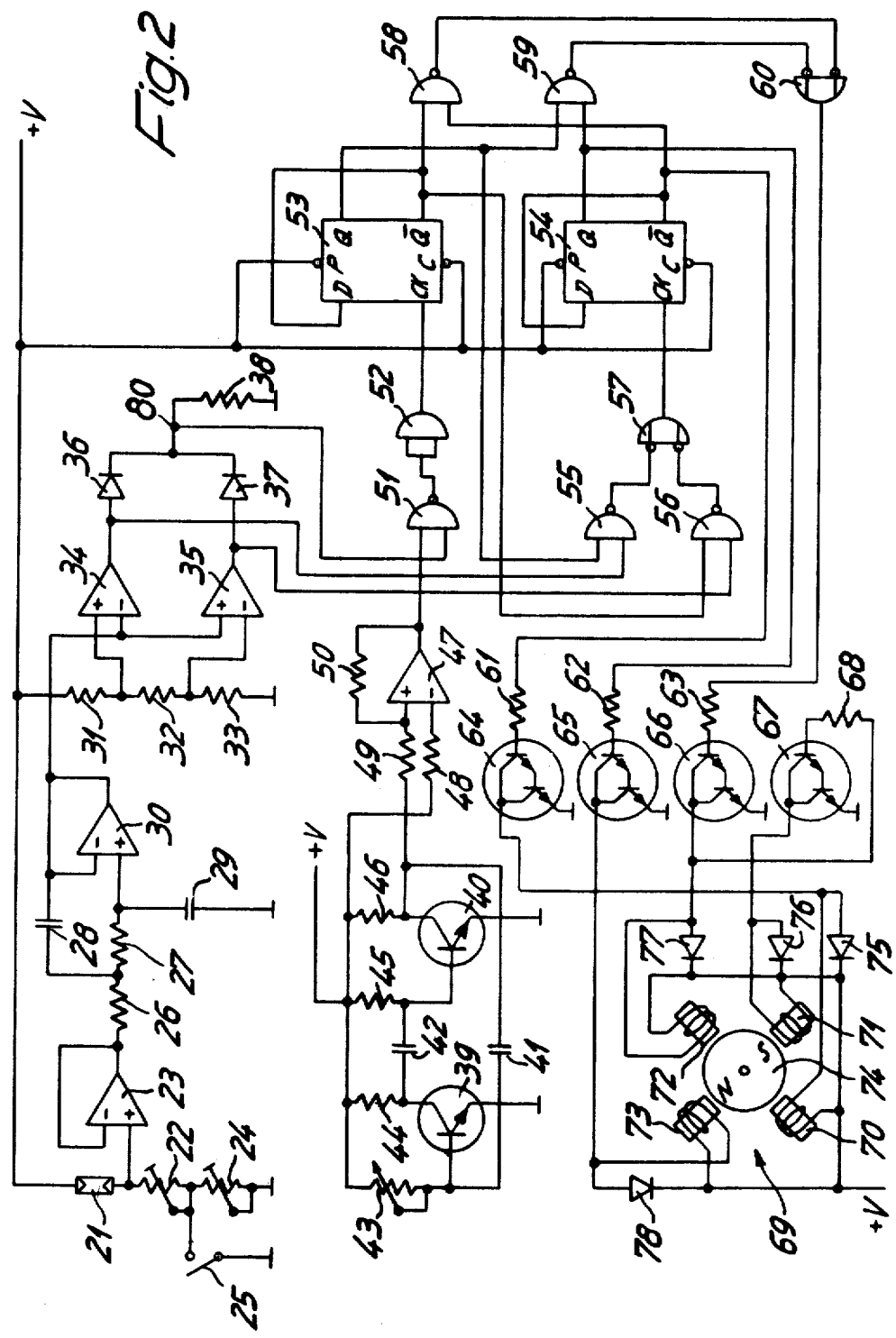
FIG. 2 is a circuit diagram of another embodiment of the exposure control.

Continuing with the description of FIG. 2, it is seen that there is provided a stepping motor 69 having four poles displaced 90° from each other, each having windings 70, 71, 72 and 73, respectively. A two-pole rotor disc 74 is the magnetic driven element.

Each actuating winding is bypassed by a diode, namely, 75, 76, 77 and 78, for over-voltage protection. One terminal of each winding connects to the positive supply line. The other terminal of each winding connects to the collectors of a transistor group arranged in Darlington configuration, namely, 64, 65, 66 and 67. The base connections of the above transistors are as follows:

The base of transistor 64 connects through resistor 61 with the inverting output $\bar{Q}$ of flip-flop 54; the base of transistor 65 through resistor 62 to the non-inverting ouput of Q of flip-flop 54; and the base of 66 through resistor 63 with the output of NOR gate 60 and the base of transistor 67 through a resistor 68 connects to the collector of transistor 66.

The exposure control described in connection with FIG. 2, operates as follows:

Let us assume first that the photoresistor 21 is behind the diaphragm of a motion picture camera and that the diaphragm is adjustable by the stepping motor 69 and is properly set. In this state, there will be a voltage output at the operational amplifier 30 which is in the region of that at the terminal of resistor 32. Consequently, at the input of operational amplifiers 34 and 35 there are such voltage differences that the outputs thereof are at an inactive state. The junction point 39 to which NAND gate 51 is connected is not triggered so that there is no switching action and there is no impulse from operational amplifier 47 to activate the sequence impulse generators at the trigger input CK of the flip-flop 53. The bi-directional counter is not activated; consequently the stepping motor is at a standstill.

When the illumination is greater than that for which the diaphragm is set, the resistance of the photosensor 21 is lowered so that the voltage input at the non-inverting input of operational amplifier 23 is higher. This causes a higher positive voltage output from operational amplifier 30. This output is higher than the prevailing positive potential at the junction point of both resistors 31 and 32. Thus the output of operational amplifier 34 is inactive whereas the output of operational amplifier 35 is elevated. The junction point 39 has a potential difference only when at least one of the operational amplifiers 34 or 35 have a rising potential; therefore, only under such conditions will there be trigger impulses conducted through the gates 51 and 52 to the trigger inputs of the flip-flops 53. Inasmuch as the inverting input $\bar{Q}$ is directly connected to the input D of the above flip-flop 53, this will be actuated at each positive sequence of the triggered impulses.

The three NAND gates 55, 56 and 57 operate as combined "yes" or "no" switches and enable a reversal of the order of the counter, depending upon the output state of operational amplifier 34 (forward counting) or the state of operational amplifier 35 (reverse counting). In the above example, the reverse counting conductor is at trigger potential so that the output signals of the inverting output $\overline{Q}$ of flip-flop 53 are switched to flip-flop 54.

In view of the fact that the windings 70 and 73 of the motor 69 connect to the non-inverting output Q and the inverting output $\overline{Q}$, respectively, of the flip-flops 54, current passes through only one of these windings. The same holds true for windings 71 and 72 inasmuch as the Darlington configuration transistor 67 has the complementary switching action of that of transistor 66. Consequently, only two windings of the stepping motor 69 are energized at any particular instant. The energizing depends on the switching condition of the flip-flops 54 and the NAND gate 60. In a reverse counting state the direction of rotation of the motor 69 is such that the diaphragm will be further closed. Consequently, the light falling on the photoresistor 21 is lowered. This operation lasts until the output voltage of operational amplifier 30 reaches the value at the terminal of resistor 32. When this condition is reached, the counter stops inasmuch as the release circuit for the sequence impulses connected to the junction at 39 is inactivated as described above.

When the exposure light is less than the value to which the diaphragm was set, the output potential at operational amplifier 30 is correspondingly lowered, i.e., less than that at the junction points of resistors 32 and 33. In this case the output of operational amplifier 34 is in an active state whereas that of 35 is in an inactive state, therefore, the counter is driven forward. The non-inverting outut signals at Q of flip-flop 53 are switched to the flip-flop 54. The difference in the above described operation is that the stepping motor now runs in the reverse direction so that the diaphragm will be opened. This continues until the output voltage of operational amplifier 30 reaches a value which falls within the range of that at the terminal of resistor 32.

It is obvious that the value of resistor 32 determines the exposure range within which the stepping motor will not be actuated. The greater the voltage drop across resistor 32, the greater is the range within which no correction of the diaphragm can take place. Consequently, the threshold response of the exposure control can be easily pre-set.

The components 26 to 30, forming the low pass filter, have the purpose of suppressing rapid light fluctuation, so that this will not interfere with the function of the exposure control.

The switch 25 serves for setting the film sensitivity. Upon closing the switch 25, the resistor 24 is short circuited so that, at a given light condition, the operational amplifier 23 receives a lower input voltage. The close position of the above switch corresponds to a lower film speed.

The invention in its broader aspects is not limited to the specific embodiments herein shown and described but changes may be made within the scope of the accompanying claims without departing from the principles of the invention and without sacrificing its chief advantages.

What is claimed is:

1. An electronic exposure control circuit for motion picture cameras, comprising a photosensitive element, an amplifier connected thereto, a stepping motor for step-wise setting the diaphragm of said camera, a reference voltage source, a voltage comparator having a pair of input terminals, one of said terminals being connected to the output of said amplifier, and the other of said inputs receiving said reference voltage, said comparator having logic outputs responsive of the polarity and of the magnitude of the voltage difference at the inputs, respectively, further comprising a bi-directional counter having an input for setting the counter into the forward or reverse mode of counting, which input is coupled to the output of the comparator which is responsive to the polarity, a clock generator, the output of which is coupled to the input of said counter and a start-stop input of the clock generator being coupled to that logic output of the comparator which is responsive to the magnitude, and a decoder interposed between the outputs of said counter and the stepping motor.

2. An exposure control circuit in accordance with claim 1, wherein said comparator comprises a pair of Schmitt triggers which are operable by positive and negative voltage pulses, respectively.

3. An exposure control circuit as claimed in claim 1, wherein the amplifier includes a low pass filter for suppressing the ripple voltage produced by the revolving shutter of the motion picture camera.

4. An electronic exposure control circuit for motion picture cameras, comprising a photosensitive element, an amplifier connected thereto, a stepping motor for step-wise setting the diaphragm of said camera, reference voltage source, a voltage comparator having a pair of input terminals, one of said terminals being connected to the output of said amplifier, and the other of said inputs receiving said reference voltage, said comparator having logic outputs, each responsive to the polarity and to the magnitude of the voltage difference at the inputs, a pair of clock generators, each of said clock generators being coupled to and individually controlled by a coordinated output of said comparator, and a decoder interposed between the output terminals of said clock generators and the input terminals of said stepping motor.

* * * * *